July 14, 1925.
D. J. STEWART
SHOCK ABSORBER
Filed July 25, 1924
1,546,326
2 Sheets-Sheet 1
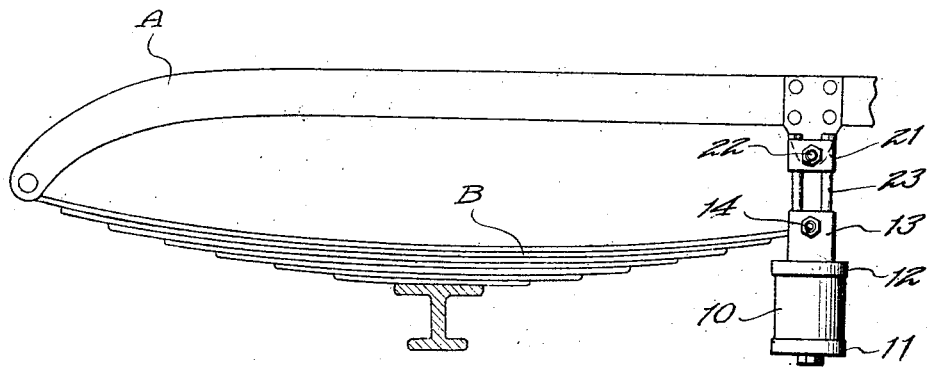
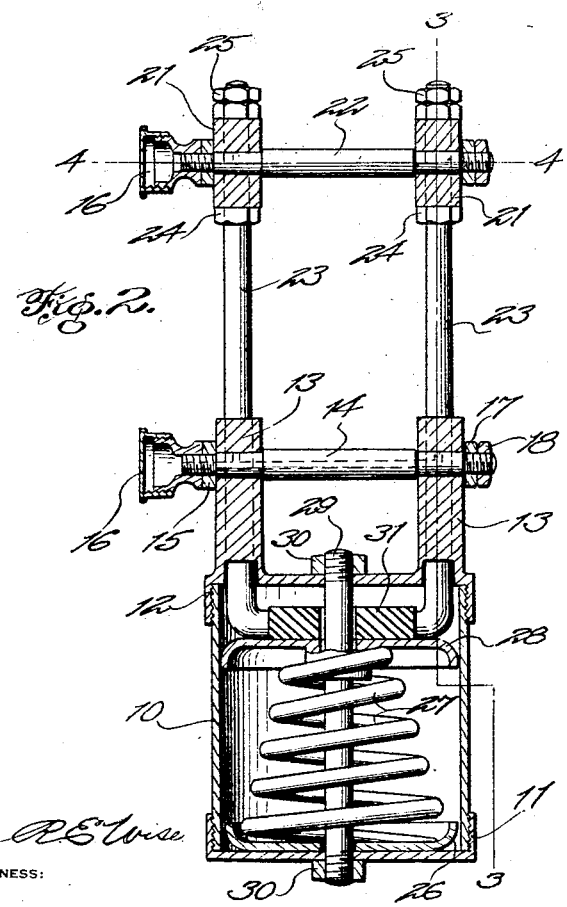
D. J. Stewart
INVENTOR
BY Victor J. Evans
ATTORNEY
WITNESS:

July 14, 1925.
D. J. STEWART
SHOCK ABSORBER
Filed July 25, 1924
1,546,326
2 Sheets-Sheet 2
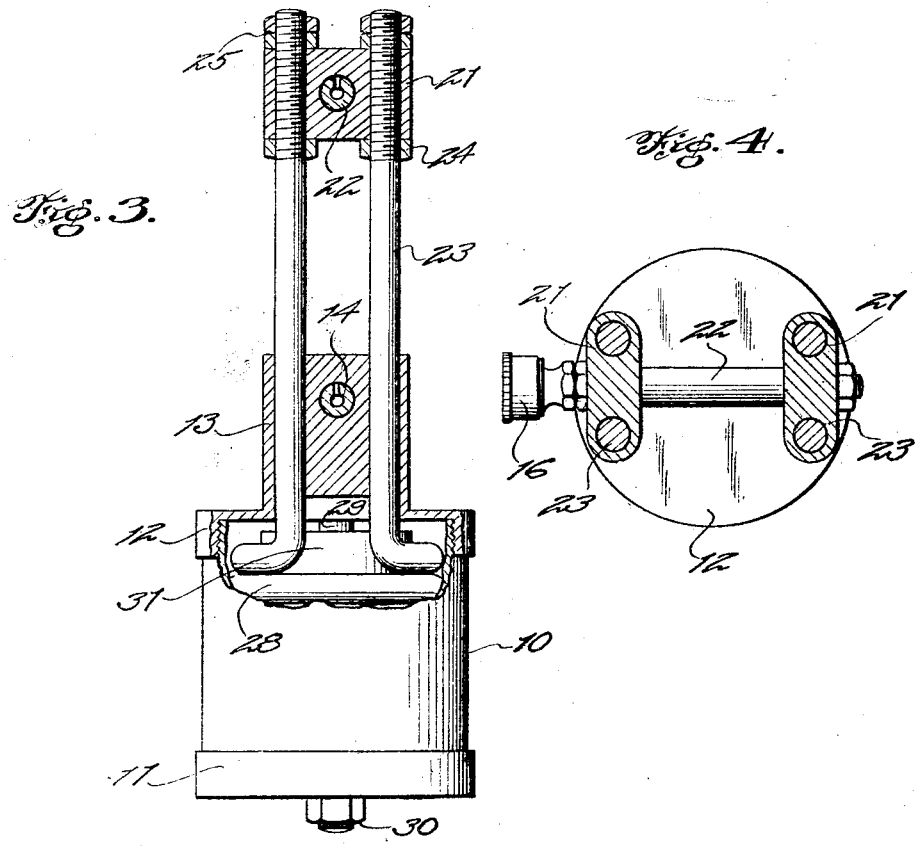

Patented July 14, 1925.

1,546,326

UNITED STATES PATENT OFFICE.

DATIS JOHN STEWART, OF LETHBRIDGE, ALBERTA, CANADA.

SHOCK ABSORBER.

Application filed July 25, 1924. Serial No. 728,241.

*To all whom it may concern:*

Be it known that I, DATIS JOHN STEWART, a subject of the King of Great Britain, residing at Lethbridge, in the Province of Alberta and Dominion of Canada, have invented new and useful Improvements in Shock Absorbers, of which the following is a specification.

This invention relates to auxiliary spring devices for vehicles, and has for its object the provision of a novel shock absorber constructed and arranged for interposition between the ordinary spring of a vehicle and its usual connection with the frame, the device including cushion means for absorbing shock and further including a spring tension device.

Another object is the provision of a device of this character which consists of a very few parts and which will therefore be simple and inexpensive to manufacture, easy to install, positive in action, efficient and durable in service, and a general improvement in the art.

With the above and other objects and advantages in view, the invention consists in the combination and arrangement of parts to be hereinafter more fully described and claimed and illustrated in the accompanying drawings in which:

Figure 1 is a side elevation showing the device in applied position.

Figure 2 is a section on the line 2—2 of Figure 1.

Figure 3 is a section on the line 3—3 of Figure 2.

Figure 4 is a cross section on the line 4—4 of Figure 2.

Figure 5 is a detail longitudinal section through one of the securing bolts.

Figure 6 is a detail perspective view of a buffer.

Figure 7 is a perspective view of one of the caps.

Referring more particularly to the drawings, the letter A designates a portion of the frame of a vehicle and B indicates the usual spring which in ordinary practice is connected with the frame member by a shackle, not shown. In carrying out the invention I provide a casing 10 upon the ends of which are screwed covers 11 and 12, the latter of which is formed with spaced upstanding parallel projections 13 receiving the end of the spring B between them. Connection with the spring is effected by a shackle bolt 14 which passes through the eye of the spring and through the projections 13. One end of this bolt carries a nut 15 and a conventional grease cup 16 while the other end carries a clamping nut 17 and a lock nut 18. The bolt is formed with a longitudinal passage or duct 19 communicating with the grease cup 16 and having lateral branches 20 leading to the bearing surfaces in the projections for the purpose of effecting lubrication thereof.

I also provide a pair of blocks 21 disposed at opposite sides of the end portion of the frame A and secured thereto by a shackle bolt 22 identical in construction with the bolt 14. Slidable through the projections 13 are U-shaped plungers 23 which are rigidly secured to the blocks 21 by means of two sets of nuts 24 and 25.

Within the bottom of the casing 10 is a cup-shaped washer or cap 26 within which is seated one end of a coil spring 27 which has its other end engaging within a similar washer or cap 28 slidable upon a vertical rod 29 which extends axially of the casing and through both covers. The ends of this rod are threaded and carry clamping nuts 30. The bight portions of the U-shaped plungers 23 enter the casing 10 and engage upon the top of the washer or cap 28. For absorbing the shock of a rebound I provide a rubber buffer or bumper 31 on top of the cap or washer 28 and adapted to engage against the underside of the upper cap 12 for reducing or absorbing the shock of the impact.

In the operation it will be apparent that when the vehicle strikes a rut or obstruction which results in compressing the spring B with respect to the frame A, the plungers 23 will slide downwardly through the projections 13 and will act to compress the spring 27 which therefore absorbs the initial shock. As stated above, the shock of the rebound is taken up by the buffer 31. Obviously, the device will reduce the shocks and jars incidental to road travel and will not only increase the easy riding qualities of a vehicle so equipped but will also prolong its useful life in relieving it of the strain of excessive vibration.

While I have shown and described the preferred embodiment of my invention, it is of course to be understood that I reserve the right to make such changes in the form, construction and arrangement of parts as will not depart from the spirit of the invention or the scope of the subjoined claim.

I claim:

A shock absorber for vehicles comprising a casing, means for securing the casing to the free end of the vehicle spring, blocks, means for securing the blocks to the vehicle frame, depending U-shaped plungers carried by the blocks and slidable into the casing in straddling relation to the first named securing means, a spring within the casing, a member resting on the spring engaged by said plungers, and a resilient buffer on the top of said member adapted to engage against the underside of the top of the casing for absorbing the shock of the rebound.

In testimony whereof I affix my signature.

DATIS JOHN STEWART.